US012435778B2

(12) United States Patent
Engerman et al.

(10) Patent No.: US 12,435,778 B2
(45) Date of Patent: *Oct. 7, 2025

(54) ELECTRIC AXLE WITH COMPACT ELECTRIC MACHINE AND GEAR TRAIN LAYOUT

(71) Applicant: Dana Automotive Systems Group, LLC, Maumee, OH (US)

(72) Inventors: Eric M. Engerman, Plymouth, MI (US); Andy Perakes, Canton, MI (US); Rick C. Sigmon, Bowling Green, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,749

(22) Filed: Aug. 16, 2024

(65) Prior Publication Data

US 2024/0410456 A1    Dec. 12, 2024

Related U.S. Application Data

(63) Continuation of application No. 18/304,901, filed on Apr. 21, 2023, now Pat. No. 12,110,952.
(Continued)

(51) Int. Cl.
*F16H 57/037*  (2012.01)
*B60K 1/00*  (2006.01)
(Continued)

(52) U.S. Cl.
CPC .......... *F16H 37/0813* (2013.01); *B60K 1/00* (2013.01); *B60K 17/043* (2013.01);
(Continued)

(58) Field of Classification Search
CPC ............ F16H 37/0806; F16H 37/0813; F16H 57/037; F16H 57/045; F16H 2057/0203;
(Continued)

(56) References Cited

U.S. PATENT DOCUMENTS 6,059,684 A * 5/2000 Sasaki ...................... B60K 1/00
                                                        180/65.6
6,401,850 B1   6/2002 Bowen
(Continued)

FOREIGN PATENT DOCUMENTS

WO    WO-2021089166 A1 * 5/2021 ........... B60K 17/356

OTHER PUBLICATIONS

Engerman, E., "Electric Axle With Compact Electric Machine and Gear Train Layout," U.S. Appl. No. 18/304,908, filed Apr. 21, 2023, 33 pages.

*Primary Examiner* — Roger L Pang
(74) *Attorney, Agent, or Firm* — McCoy Russell LLP

(57) ABSTRACT

An electric axle is provided. The electric axle includes, in one example, an electric machine rotationally coupled to a layshaft via a first gear reduction and a differential rotationally coupled to the first gear reduction, a first axle shaft, and a second axle shaft. In the electric axle, the electric machine is positioned laterally between at least two drive wheels that are rotationally coupled to the first axle shaft and the second axle shaft and a rotational axis of the electric machine is axially offset from rotational axes of the at least two drive wheels.

13 Claims, 7 Drawing Sheets

Related U.S. Application Data

(60) Provisional application No. 63/363,366, filed on Apr. 21, 2022.

(51) Int. Cl.
  *B60K 17/04* (2006.01)
  *B60K 17/16* (2006.01)
  *F16H 37/08* (2006.01)
  *F16H 48/34* (2012.01)
  *F16H 57/04* (2010.01)
  *B60K 6/36* (2007.10)
  *F16H 57/02* (2012.01)

(52) U.S. Cl.
  CPC .......... B60K 17/165 (2013.01); F16H 48/34 (2013.01); F16H 57/037 (2013.01); F16H 57/045 (2013.01); *B60K 2001/001* (2013.01); *B60K 6/36* (2013.01); *B60Y 2200/92* (2013.01); *F16H 2057/0203* (2013.01); *F16H 2057/02034* (2013.01); *F16H 2057/02052* (2013.01)

(58) Field of Classification Search
  CPC . F16H 2057/02034; F16H 2057/02052; B60K 1/00; B60K 17/043; B60K 17/165; B60K 6/36
  USPC ......... 475/150, 225, 200, 201, 206; 180/371
  See application file for complete search history.

(56) References Cited

U.S. PATENT DOCUMENTS

| | | |
|---|---|---|
| 8,403,088 B2 | 3/2013 | Knoblauch et al. |
| 8,678,118 B2* | 3/2014 | Takenaka ............... B60K 6/52 180/65.6 |
| 8,936,120 B2 | 1/2015 | Takagi |
| 8,998,765 B2 | 4/2015 | Sten |
| 9,527,382 B2 | 12/2016 | Smetana |
| 9,593,754 B2 | 3/2017 | Sten |
| 9,625,021 B2 | 4/2017 | Knoblauch et al. |
| 9,783,035 B1 | 10/2017 | Huang et al. |
| 10,500,951 B2 | 12/2019 | Pydin |
| 10,518,627 B2 | 12/2019 | Nagpal et al. |
| 10,525,810 B2 | 1/2020 | Jegebris et al. |
| 11,448,305 B2 | 9/2022 | Engerman |
| 12,110,952 B2* | 10/2024 | Engerman ............. F16H 57/045 |
| 2013/0019707 A1 | 1/2013 | Ebihara et al. |
| 2019/0283566 A1 | 9/2019 | Nilsson |
| 2020/0055391 A1 | 2/2020 | Kumar et al. |
| 2020/0278020 A1* | 9/2020 | Inoue .................... F16H 57/021 |
| 2022/0111740 A1* | 4/2022 | Inoue .................... F16H 3/728 |
| 2022/0205530 A1 | 6/2022 | Ishikawa et al. |
| 2022/0274476 A1* | 9/2022 | Yamashita ............. B60K 17/12 |
| 2022/0274484 A1* | 9/2022 | Jinnai ................... B60K 17/12 |
| 2022/0336825 A1 | 10/2022 | Speidel et al. |
| 2022/0364631 A1 | 11/2022 | Glückler et al. |
| 2023/0128748 A1 | 4/2023 | Umerley et al. |

* cited by examiner

ELECTRIC AXLE WITH COMPACT ELECTRIC MACHINE AND GEAR TRAIN LAYOUT

CROSS-REFERENCE TO RELATED APPLICATIONS

The present application is a continuation of U.S. Non-Provisional patent application Ser. No. 18/304,901, entitled "ELECTRIC AXLE WITH COMPACT ELECTRIC MACHINE AND GEAR TRAIN LAYOUT," and filed on Apr. 21, 2023. U.S. Non-Provisional patent application Ser. No. 18/304,901 claims priority to U.S. Provisional Patent Application No. 63/363,366, entitled "ELECTRIC AXLE WITH COMPACT ELECTRIC MACHINE AND GEAR TRAIN LAYOUT," and filed on Apr. 21, 2022. The entire contents of the above-listed applications are hereby incorporated by reference for all purposes.

TECHNICAL FIELD

The present disclosure relates to an electric axle with a space efficient architecture for incorporation into a support structure.

BACKGROUND AND SUMMARY

Segments of the vehicle market are moving towards electrification. However, the inventors have recognized that vehicle platform electrification presents investment costs and project management complexity which create challenges for automotive manufacturers and suppliers. Attempts have been made to manage this complexity by carrying over certain features of existing vehicle platforms when electrifying the platforms. The inventors have recognized that the carry-over of these components may create packaging challenges. Specifically, features of certain hybrid powertrains and their engine componentry may impose space constraints on electric axles such as electrified rigid beam axles. Other vehicle components may pose space constraints on electric drive units such as the vehicle frame, specifically during suspension jounce and rebound.

The inventors have recognized the abovementioned challenges and developed an electric axle assembly (e.g., an electric beam axle assembly) to at least partially overcome the challenges. The electric axle assembly includes, in one example, an electric machine that is rotationally coupled to a layshaft via a first gear reduction. The electric axle assembly further includes a differential rotationally coupled to the layshaft via a second gear reduction. The electric axle assembly even further includes a first axle shaft and a second axle shaft directly rotationally coupled to the differential. In the electric axle assembly, the electric machine is positioned laterally between at least two drive wheels that are rotationally coupled to the first axle shaft and the second axle shaft. Further, in the electric axle assembly, a rotational axis of the electric machine is axially offset from rotational axes of the at least two drive wheels. Still further, in the electric axle assembly, rotational axes of the drive wheels are offset from rotational axes of the first and second axle shafts. In this way, the electric machine is space efficiently packaged in the axle assembly in a location which does not interfere with the vehicle frame during suspension jounce and rebound. Consequently, suspension performance of vehicles which make use of the electric axle assembly is increased, if desired.

In one example, the electric axle assembly may further include wheel end gear reductions rotationally coupled to the first and second axle shafts. In such an example, the differential may be a locking differential designed to selectively inhibit speed differentiation between the first and second axle shafts. When the electric axle uses a locking differential, the wheel end gear reductions may be sized to full axle torque. Using wheel end gear reductions allows the electric axle to achieve a component layout that can be effectively incorporated into a support structure. As such in another example, the electric axle may further include the support structure that at least partially encloses the electric machine and the differential. In such an example, the support structure may include vertically extending protrusions that are profiled to mate with an engine cradle. In this way, the electric machine and differential may be incorporated into a support structure that is profiled to efficiently share a space with the engine cradle, in certain powertrain architectures.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric axle assembly for a vehicle that has a pseudo dual-layshaft arrangement is described herein. The electric axle achieves a more space efficient arrangement than previous electric drive axles while achieving electric drive performance targets. To achieve the space efficient electric axle package that is less likely to interfere with surrounding vehicle components, an electric machine is positioned axially offset from the rotational axes of the drive wheels while positioning the electric machine laterally between the drive wheels. Further, in such an example, one of the axle shafts may extend along the length of the electric machine to facilitate packaging of the electric machine between the drive wheels.

Figure 1:
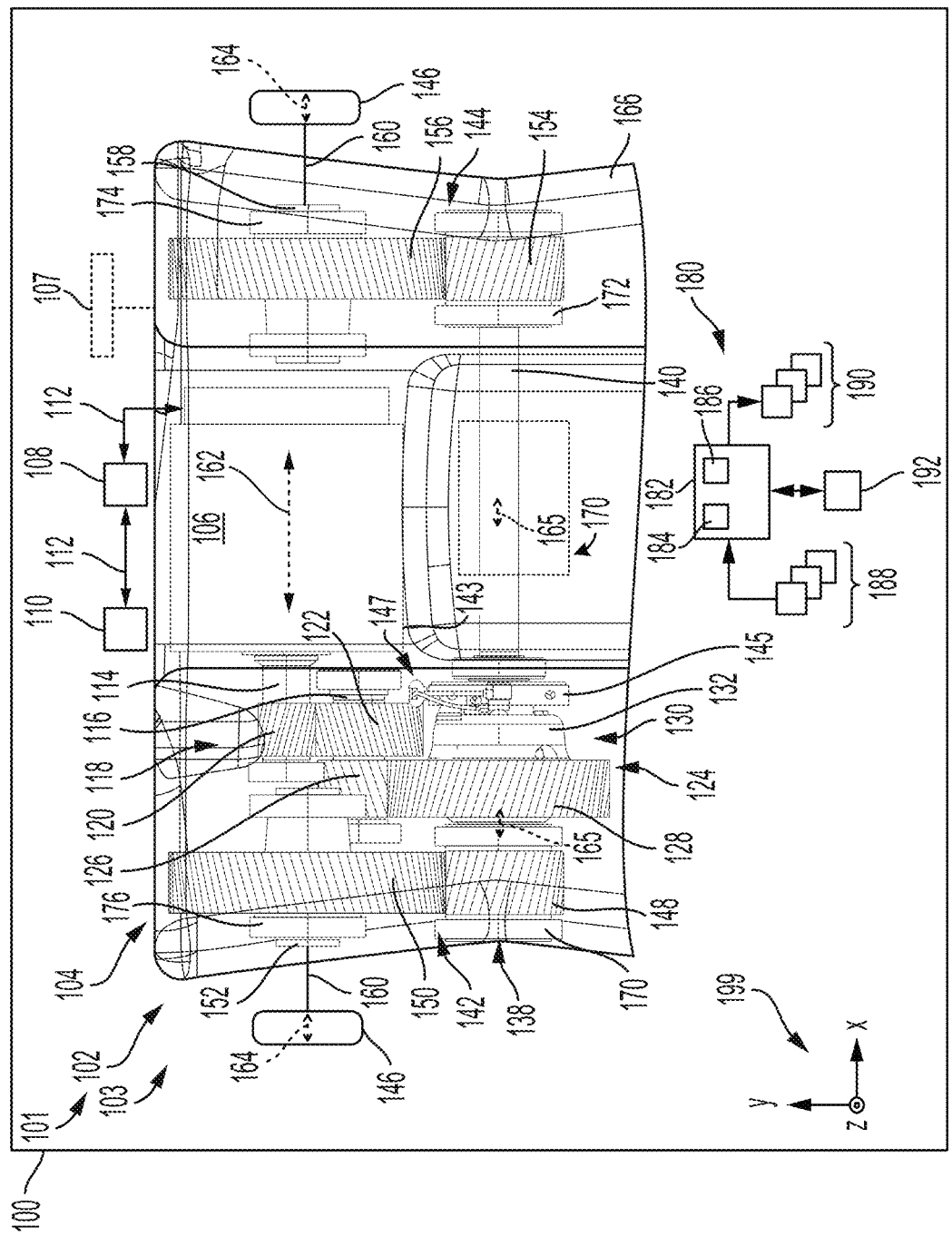
FIG. 1 shows a top view of an electric drive assembly in a vehicle, the electric drive assembly including an electric axle packaged in a support structure.
Figure 2:
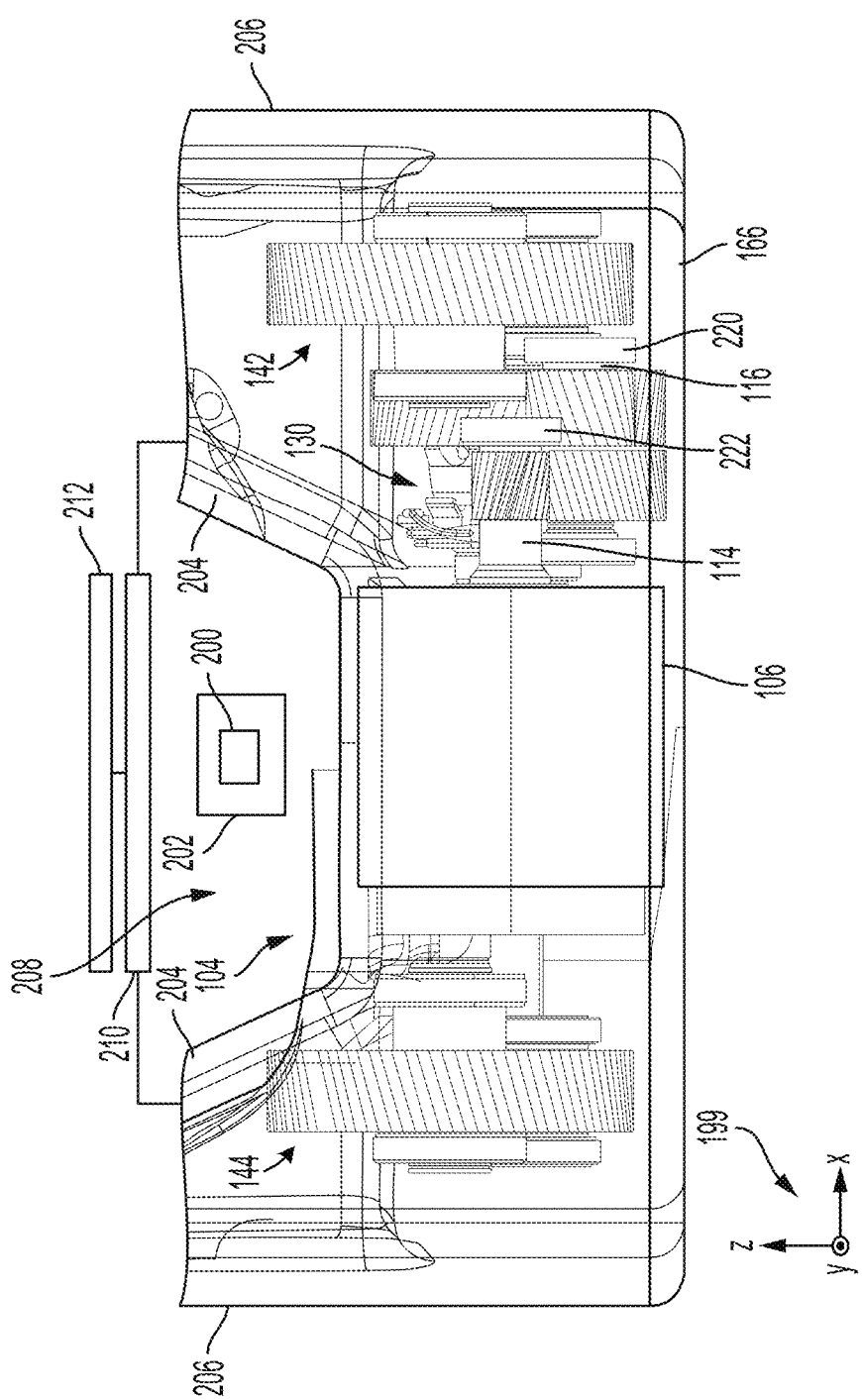
FIG. 2 shows a side view of the electric axle and the support structure, depicted in FIG. 1.
Figure 3:
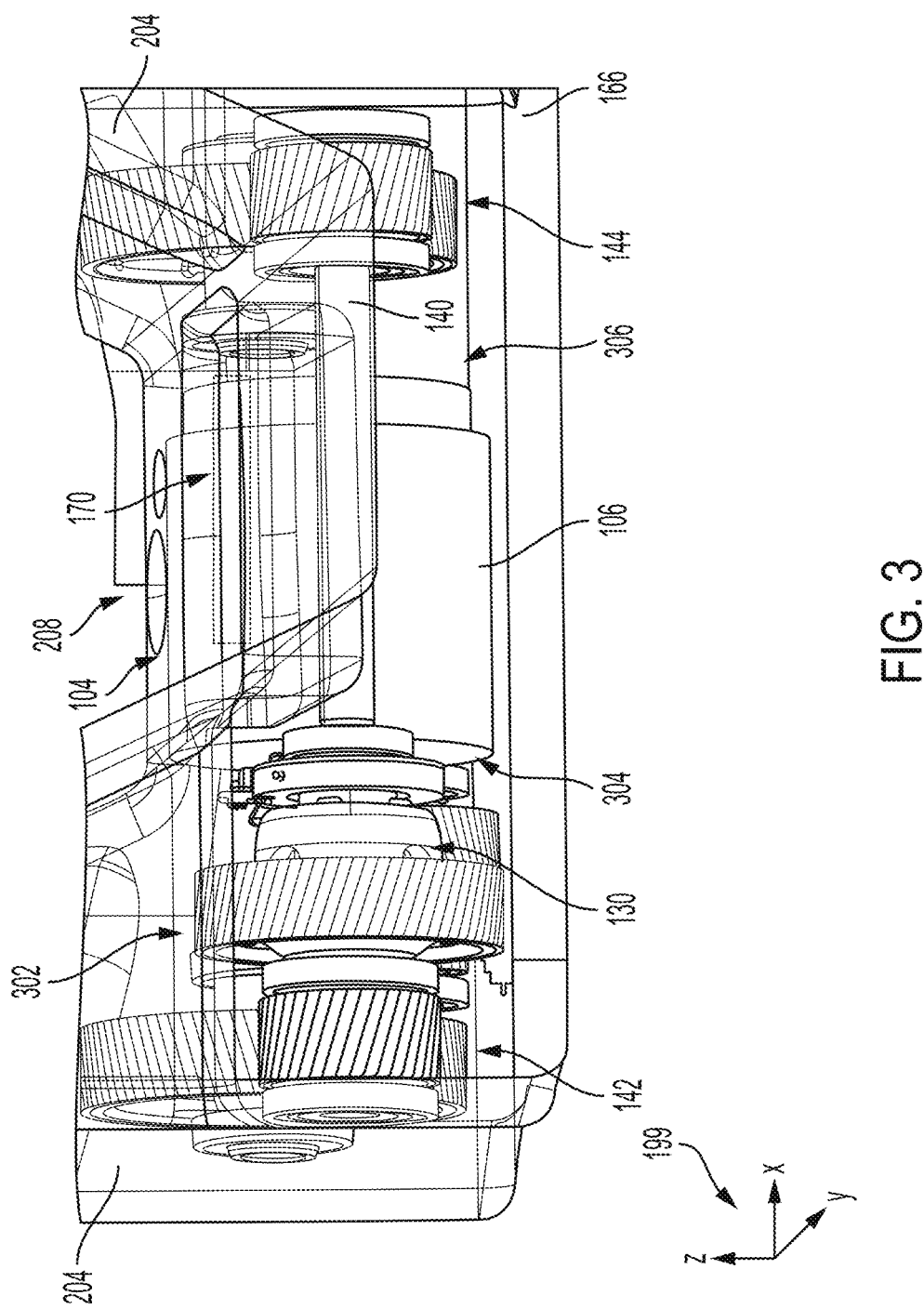
FIG. 3 shows a perspective view of the electric axle and the support structure, depicted in FIG. 1.
Figure 4:
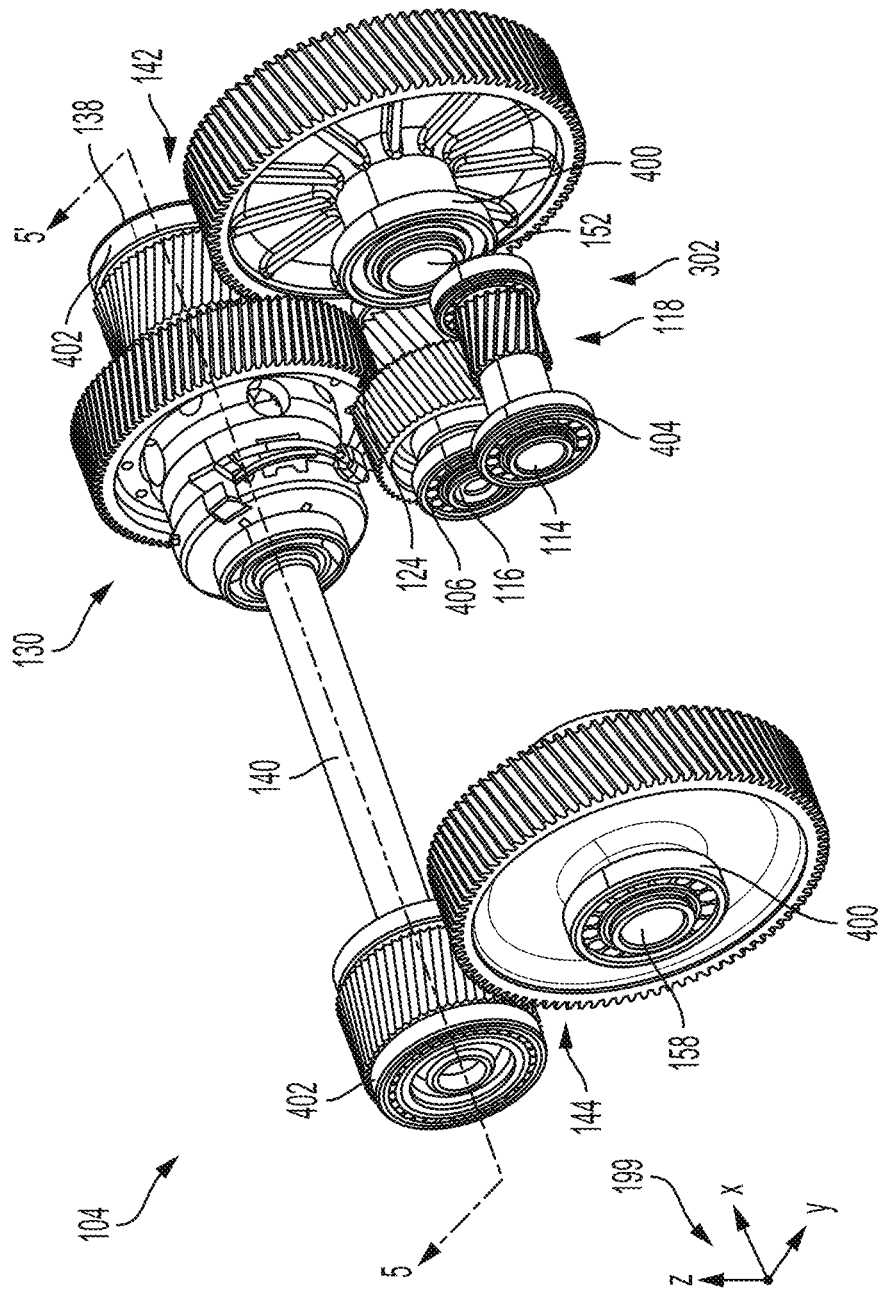
FIG. 4 shows a perspective view of a gear train in the electric axle, depicted in FIG. 1.
Figure 5:
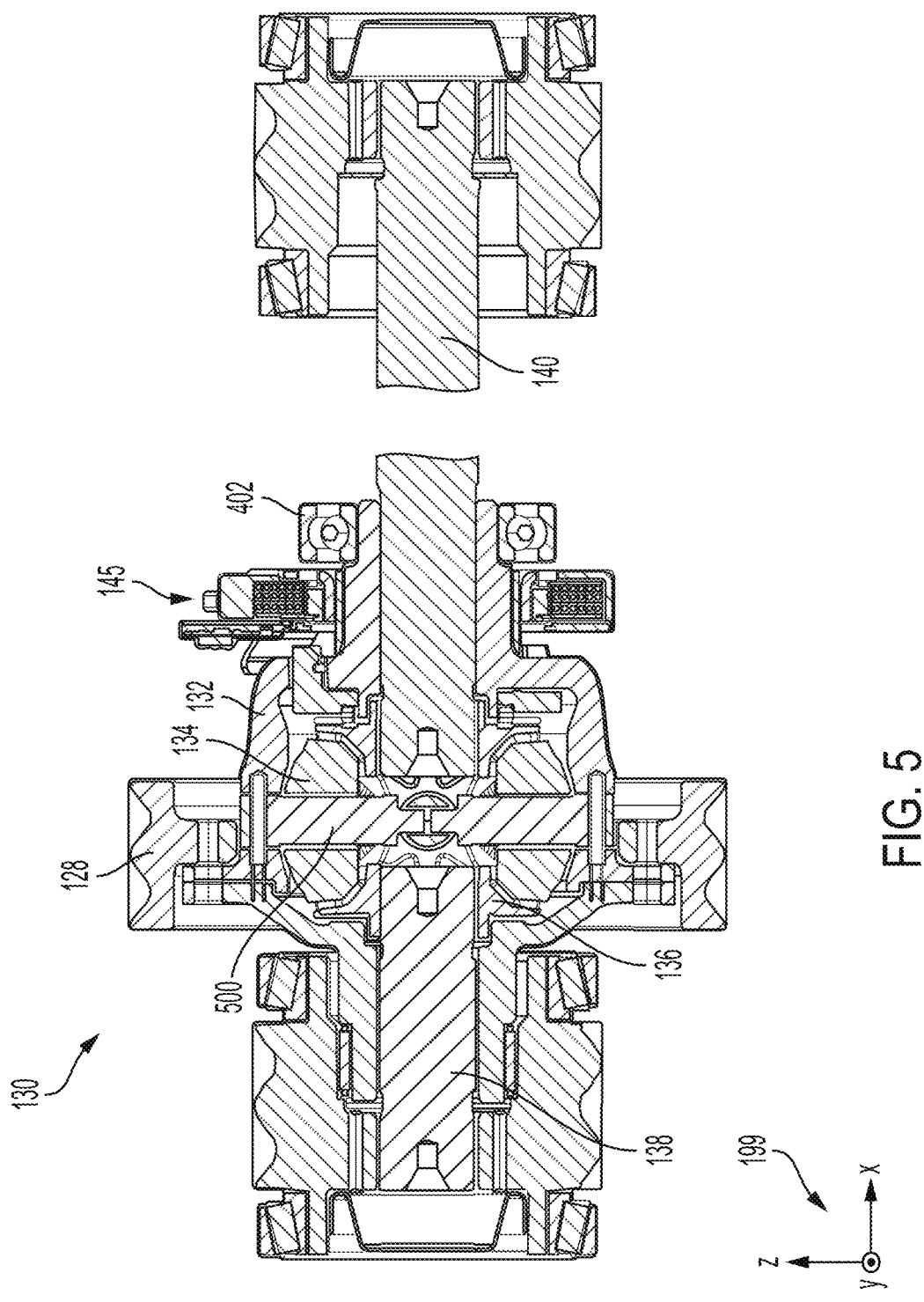
FIG. 5 shows a cross-section of the differential included in the electric axle, depicted in FIG. 1.

FIG. 1 shows a vehicle with an electric axle efficiently packaged in a support structure. FIGS. 2-3 show different views of the electric axle and support structure. FIG. 4 shows a detailed view of a gear train included in the electric axle with a pseudo dual-layshaft arrangement. FIG. 5 depicts a cross-sectional view of a differential in the electric axle.

Figure 6:
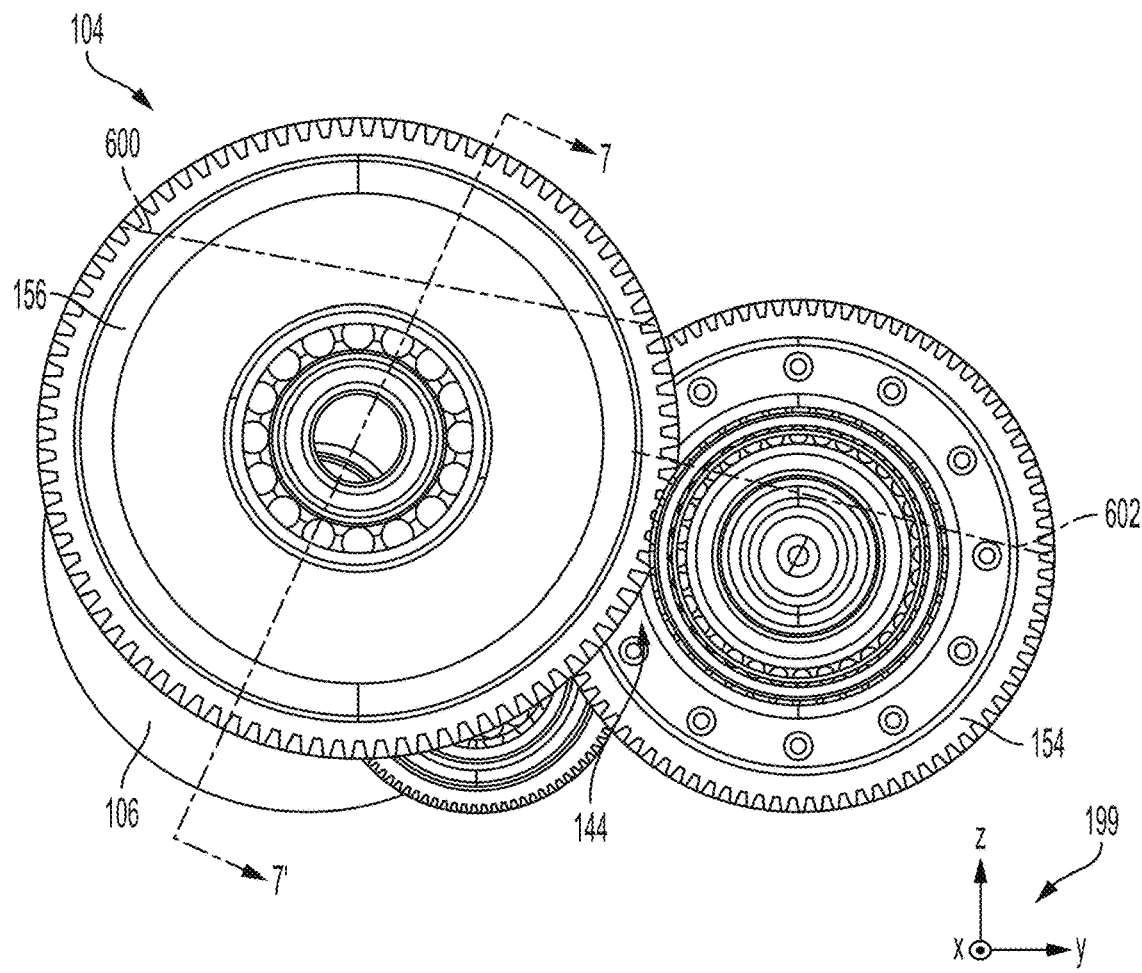
FIG. 6 shows a side view of the electric axle, depicted in FIG. 1.
Figure 7:
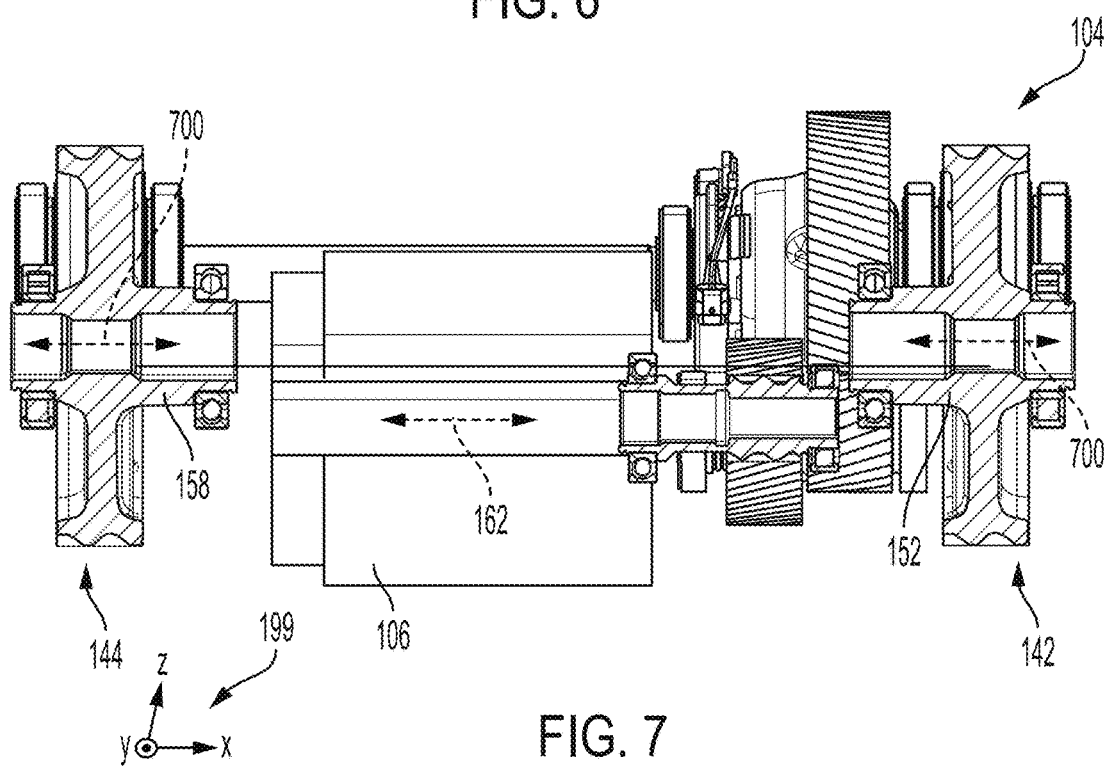
FIG. 7 shows a cross-sectional view of the electric axle, depicted in FIG. 1.
Figure 8:
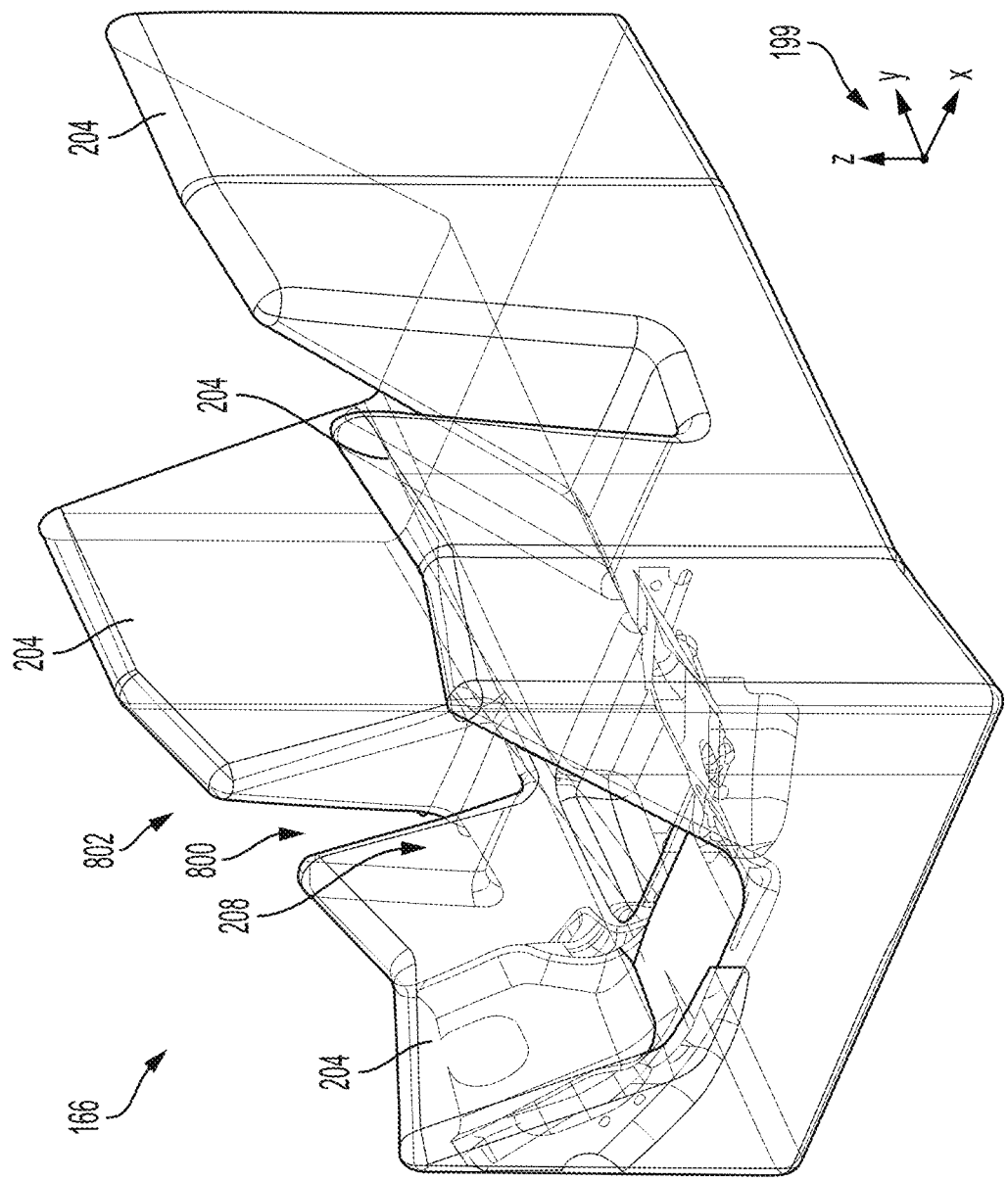
FIG. 8 shows a detailed perspective view of the support structure, depicted in FIG. 1.

FIGS. 6-7 show different detailed views of the electric axle and FIG. 8 shows a perspective view of the support structure.

FIG. 1 shows a vehicle 100 that includes a powertrain 102 with an electric drive assembly 101 that includes an electric axle assembly 103 with an electric axle 104 which may be formed as an assembly. As described herein an electric axle is an electric drive incorporated into an axle. The electric axle may be an electric beam axle, in one example. A beam axle is an axle with mechanical components structurally supporting one another and extending between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, the camber angle of the wheels may remain substantially constant as the suspension moves through its travel. The beam axle may be coupled to a dependent suspension system 107, in one example. Therefore, the electric axle may be an unsprung mass.

The electric axle 104 includes an electric machine 106 (e.g., traction motor). The electric machine 106 may be an electric motor-generator, for example. For instance, the electric machine 106 may be designed as a multi-phase alternating current (AC) motor-generator. However, in other examples, the electric machine may be a motor without generator capabilities.

As illustrated in FIG. 1, the electric machine 106 may be electrically coupled to an inverter 108. The inverter 108 is designed to convert direct current (DC) electric power to alternating current (AC) electric power and vice versa. Therefore, the electric machine 106 may be an AC electric machine, as previously indicated. However, in other examples, the electric machine may be a DC electric machine and the inverters may therefore be omitted from the electric drive, in such an example. The inverter 108 may receive electric energy from one or more energy storage device(s) 110 (e.g., traction batteries, capacitors, combinations thereof, and the like). Arrows 112 signify the electric energy transfer between the electric machine 106, the inverter 108, and the energy storage device(s) 110 that may occur during different modes of electric axle operation (e.g., a drive mode and a regeneration mode). As such, during a drive mode, electric energy may flow from the energy storage device(s) 110 to the electric machine 106 and during a regenerative mode, electric energy may flow in the opposite direction from the electric machine to the energy storage device(s).

The electric axle 104 further includes an input shaft 114 and a layshaft 116 (e.g., idler shaft). A gear reduction 118 including a gear 120 on the input shaft 114 and a gear 122 on the layshaft 116. Thus, these gears 120, 122 are rotationally coupled the input shaft 114 and the layshaft 116, respectively. As described herein a gear reduction includes a pair of gears with teeth that mesh with one another. A gear reduction 124, with a gear 126 on the layshaft 116 and a gear 128 in a differential 130, provides a rotational connection between the layshaft and the differential.

The differential 130 includes a case 132, pinion gears 134, and side gears 136, shown in FIG. 5 that allow for speed differentiation between a first axle shaft 138 and a second axle shaft 140. Wheel end gear reductions 142, 144 are coupled to the first axle shaft 138 and the second axle shaft 140, respectively. The wheel end gear reductions 142, 144 are specifically illustrated as final drive gear reductions. However, in alternate examples, the electric axle may include additional gear reductions between the axle shafts 138, 140 and drive wheels 146. A wheel end gear reduction refers to a gear reduction downstream of the interface between the differential and the axle shafts.

In the illustrated example, the differential 130 includes a locking device 145. However, in other examples, the locking device may be omitted and the differential may be an open differential. The locking device 145 locks and unlocks the differential. When locked (e.g., engaged), a speed variance between the axle shafts 138, 140 is inhibited by the differential. Conversely, when the locking devices is unlocked (e.g., disengaged) a speed variance between the axle shafts is permitted. The locking device 145 may be electromagnetically actuated via an electro-magnetic actuator 147 (e.g., a solenoid), in one example. To elaborate, the electromagnetic actuator may induce movement of a piston to lock a gear in the differential. However, in other examples, the locking device may be hydraulically or pneumatically actuated. The use of a locker in the differential 130 enables the drive axle's tractive performance to be enhanced during selected operating conditions. The wheel end gear reductions 142 and 144 (e.g., the final gear reductions), shown in FIG. 1 are used in the electric axle 104 to allow the locking device 145 to use less energy for actuation due to the differential seeing less torque than axles without the wheel end gear reductions near the wheels.

The axle shafts 138 and 140 have unequal lengths such that the axle shaft 140 passes by a side 143 of the electric machine 106. Designing the axle shafts in this manner enables the electric axle to achieve an architecture that may be more effectively incorporated into vehicle platforms.

The gear reduction 142 includes a gear 148 on the first axle shaft 138 and a gear 150 on a wheel shaft 152. Thus, the gears are rotationally coupled to the corresponding shaft and rotate together. Likewise, the gear reduction 144 includes a gear 154 on the second axle shaft 140 and a gear 156 on a wheel shaft 158. The wheel shafts 152, 158 are rotationally coupled to (e.g., directly coupled to) drive wheels 146 as denoted via lines 160.

Bearings 171 coupled to the axle shaft 138 are positioned in opposing axial sides of the gear 148 in the illustrated example. Likewise, bearings 172 coupled to the axle shaft 140 are positioned on opposing axial sides of the gear 154, in the illustrated example. Further, bearings 174 are positioned on opposing axial sides of the gear 156 and bearings 176 are positioned on opposing axial sides of the gear 150, in the illustrated example. Further, the bearings 176 are coupled to the wheel shaft 152 and the bearings 174 are coupled to the wheel shaft 158. In this way, the loads on the axle shafts and wheel shafts caused by the wheel end gear reductions may be at least partially transferred to the bearings to increase the axle's load carrying capacity and longevity. However, other bearings arrangements for the wheel end gear reductions have been contemplated.

A rotational axis 162 of the electric machine 106 is axially offset from rotational axes 164 of the drive wheels 146. It will be appreciated that het rotational axes 164 of the drive wheels are coaxial to the rotational axes of the wheel shafts 152 and 158. Thus, the electric machine 106 is off wheel center. In this way, the electric axle 104 achieves desired packaging goals that reduces the chance (e.g., avoids) of the axle interfering with surrounding components such as a frame, particularly during suspension system movement (e.g., jounce and rebound). Further, the rotational axes 164 of the drive wheels 146 are axially offset from the rotational axes 165 of the axle shafts 138 and 140. Further, the axes 165 are coaxially arranged. In this way, the electric axle achieves greater compactness and a profile that further reduces the chance of axle interference with surrounding vehicle systems.

The electric machine 106 is positioned laterally between the drive wheels 146 and the gear reductions 142, 144 (e.g., final drive gear reductions). However, as discussed in greater detail herein the electric machine's rotational axis is offset from the rotational axes of the drive wheels. In this way, the electric axle assembly may achieve target packaging goals which avoids spatial interference with surrounding vehicle components such as the vehicle frame. To accomplish this electric machine arrangement, the second axle shaft 140 is longer than the first axle shaft 138. As such, the second axle shaft 140 may extend from the differential 130, which is positioned on one lateral side of the electric machine 106, to the gear reduction 144, which is positioned on the other lateral side of the electric machine 106. The second axle shaft 140 may rotationally couple to both the differential 130 and the gear reduction 144, and as such transfers torque from the differential 130 to the gear reduction 144. The first axle shaft 138 may extend from the differential 130 to the gear reduction 142, both of which are positioned on the same lateral side of the electric machine 106. However, other axle shaft configurations may be used, in other examples.

The second axle shaft 140 may pass under an oil reservoir 170 (e.g., an oil pan) that may be included a lubrication system such as a lubrication system for an internal combustion engine 200, shown in FIG. 2, when the vehicle is designed as a hybrid electric vehicle. In this hybrid vehicle example, the internal combustion engine may be used to provide mechanical power to another axle and/or run as a generator for range extension capabilities. In this way, the length of the second axle shaft may allow the electric axle to achieve a package that space efficiently interfaces with the oil reservoir and the lubrication system, more generally. However, in other examples, the oil reservoir and associated lubrication system may be omitted from the vehicle. The electric axle 104 is shown at least partially incorporated within a support structure 166. The support structure 166 is described in greater detail herein with regard to FIG. 2. Positioning the axle shaft 140 under the oil reservoir allows the axle's space efficiency to be increased.

The vehicle 100 may also include a control system 180 with a controller 182. The controller 182 includes a processor 184 and memory 186. The memory 186 holds instructions stored therein that when executed by the processor 184 cause the controller 182 to perform the various methods, control techniques, etc., described herein. The processor 184 may include a microprocessor unit and/or other types of circuits. The memory 186 includes known data storage mediums such as random access memory, read only memory, keep alive memory, combinations thereof, and the like.

The controller 182 may receive various signals from sensors 188 positioned in different locations in the vehicle 100 and the electric axle 104, more specifically. The sensors may include an electric machine speed sensor, energy storage device temperature sensor(s), an energy storage device state of charge sensor(s), wheel speed sensors, and the like. The controller 182 may also send control signals to various actuators 190 coupled at different locations in the vehicle 100, and the electric axle 104. For instance, the controller 182 may send signals to the inverter 108 to adjust the rotational speed of the electric machine 106. The other controllable components in the vehicle and powertrain may function in a similar manner with regard to command signals and actuator adjustment. For instance, the controller 182 may send signals to a locking device in a differential to selectively prevent speed differentiation between the axle shafts. The locking device for the differential is discussed in greater detail herein with regard to FIG. 5.

The vehicle 100 may also include one or more input device(s) 192 (e.g., an accelerator pedal, a brake pedal, a differential locker actuator, a console instrument panel, a touch interface, a touch panel, a keyboard, combinations thereof, and the like) in electronic communication with the controller 182. The input device(s) 192, responsive to operator input, may generate an acceleration adjustment request.

An axis system 199 is provided in FIG. 1, as well as in FIGS. 2-8, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

The gears in the electric axle 104 are illustrated as helical gears. Helical gears generate less noise, vibration, and harshness (NVH) during operation than spur gears. However, other types of gears may be used in the electric axle, in alternate examples.

In one use-case example, the electric machine 106 may be designed as a 300-350 kilowatt (kW) motor. However, the electric machine may be designed with a different suitable power output, in other examples. The size of the motor may be selected based on the axle's end-use design targets such as expected vehicle weight, vehicle speed range, vehicle load, and the like. Further, the overall gear ratio for the electric axle may be between 12:1 and 16:1, in one use-case example. However, the overall gear ratio of electric axle may have other suitable values, in other examples, which may be selected based on a variety of parameters such as the motor's size, vehicle weight, powertrain performance targets, and the like.

FIG. 2 shows the electric axle 104, depicted into FIG. 1, incorporated into the support structure 166 (e.g., an axle support structure). The support structure 166 may be designed for use in a variety of powertrain configurations. For instance, the support structure 166 may be used in a hybrid powertrain where the electric axle 104 is incorporated into the support structure, and the support structure mates with an engine cradle 202. In such an example, the internal combustion engine 200 may be a transversely arranged. Thus, the engine's crankshaft may be parallel to the rotational axis of the electric machine 106 or the drive wheels 146. In such an embodiment, the engine and transmission may create a number of packaging constraints for the electric axle.

The electric axle 104 is shown positioned in the support structure 166, as indicated above. To elaborate, the support structure 166 includes vertically extending protrusions 204 that are positioned lateral to sides 206 of the support structure 166 and a recess 208 formed between the vertically extending protrusions 204. The recess 208 may be sized to mate with the engine cradle 202, schematically depicted in FIG. 2.

The vehicle 100 may further include a suspension system 210 and a frame 212, schematically depicted in FIG. 2. As such, the electric axle 104 along with the support structure 166 may be unsprung masses.

FIG. 2 further shows bearings 220 coupled to opposing axial ends of the layshaft 116. In the illustrated example, a bearing 222 is further coupled to the input shaft 114. However, the electric axle may have other bearing arrangements, in other examples. FIG. 2 again shows the electric machine 106. The differential 130 and the wheel end gear reduction 142 are positioned on a first axial side of the electric machine 106 and the wheel end gear reduction 144 are positioned on the opposing axial side of the electric machine. In this way, the axle is profiled to effectively fit within the support structure 166. However, other differential and wheel end gear reduction layouts may be used, in other examples.

FIG. 3 shows another view of the electric axle 104 and the support structure 166. The lateral position of the electric machine 106 between the wheel end gear reductions 142, 144 is clearly shown. As shown, the support structure 166 at least partially encloses electric axle components such as the electric machine 106 and the gear train 302 which provides mechanical power to the differential 130 during axle operation. The gear train in the electric axle is depicted as a single speed gear train which is more compact, has a diminished likelihood of component degradation, and avoids power interruptions during shifting transients when compared to multi-speed gear trains. However, in other examples, clutches for shifting the gear train between different operating gear ratios may be used in the electric axle. Further, the gear train 302 is shown positioned on a first axial side 304 of the electric machine 106 opposite the gear reduction 144 on a second axial side 306 of the electric machine. The second axle shaft 140 may extend from the differential 130 on the first axial side 304 of the electric machine 106 to the gear reduction 144 on the second axial side 306 of the electric machine 106.

FIG. 3 further shows the electric machine 106 positioned in a section of the support structure 166 below the recess 208. The electric machine 106 is also positioned laterally between the gear reductions 142, 144. Further, the gear reductions 142, 144 are not positioned vertically below the electric machine 106 and extend vertically into protrusions 204 of the support structure 166. In this way, the components of the electric drive are efficiently packaged in the cradle shaped support structure. However, the electric axle may have another layout with regard to the drive wheel gear reductions, the electric machine, and the support structure, in other embodiments. FIG. 3 again shows the oil reservoir 170 and the axle shaft 140 passing under the reservoir to increase axle compactness.

FIG. 4 shows a detailed view of the electric axle 104 with the support structure and the electric machine removed to more clearly reveal underlying components in the gear train 302.

The input shaft 114, the differential 130, the layshaft 116, the axle shafts 138 and 140, the wheel shafts 152 and 158, with the gear reduction 118, the gear reduction 124, and the final drive gear reductions 142, 144 are again depicted.

Bearings 400 are shown coupled to the gears in the gear reductions 142 and 144 (e.g., final drive gear reductions). Further, bearings 402 are shown coupled to the axle shafts 138 and 142 on opposing sides of gears in the gear reductions 142 and 144. Additionally, bearings 404 are coupled to opposing ends of the input shaft 114 and bearings 406 are shown coupled to opposing ends of the layshaft 116. A bearing as described herein includes roller elements (e.g., cylindrical rollers, tapered cylindrical rollers, spherical balls, and the like) as well as races that contain the roller elements. As such, the bearings described herein support a component to which they are attached. Cutting plane 5-5' indicating the cross-sectional view shown in FIG. 5 is illustrated FIG. 4.

The wheel shafts 152 and 158 may be positioned on one longitudinal side of (e.g., in front of or behind) the axle shafts 138 and 140 with regard to the longitudinal axis (the y-axis). In this way, the electric axle's is profiled to more effectively be incorporated into a wider variety of vehicle platforms. FIG. 4 further shows the layshaft 116 positioned vertically below (with regard to the z-axis) the input shaft 114, the axle shafts 138 and 140, and the wheel shafts 152 and 158. In this way, the gear reductions used to connect the input shaft to the differential may be spaced efficiently incorporated into the electric axle. However, the layshaft and/or wheel shafts may have other suitable positions in alternate examples.

FIG. 5 depicts the differential 130 and the axle shafts 138, 140 rotationally coupled thereto. The differential 130 includes the case 132 with the gear 128 rotationally coupled thereto. The differential 130 further includes pinion gears 134 driven by the case 132, during drive operation. The pinion gears 134 are coupled via a shaft 500 and mesh with side gears 136. The side gears 136 are in turn rotationally coupled to the axle shafts 138 and 140.

The locking device 145 of the differential 130 is again illustrated in FIG. 5. In the illustrated example, the locking device 145 is positioned axially between the gear 128 and one of the bearings 402, to increase axle compactness, although other locking device positions have been contemplated.

FIG. 6 shows a side view of the electric axle 104 with the electric machine 106 and the gear reduction 144 (e.g., final gear reduction) again depicted. Line 600 indicates a location of a lower surface of a vehicle frame that is positioned behind the gear 156, in the frame of reference of FIG. 6. Line 602 indicates a location of a lower wall of an oil pan that is positioned behind the gear 154, in the frame of reference of FIG. 6. In this way, the electric axle may be profiled for efficient vehicle packaging while avoiding spatial interference with surrounding components. Cutting plane 7-7' indicating the cross-sectional view shown in FIG. 7 is illustrated FIG. 6.

FIG. 7 shows a cross-sectional view of the electric axle 104. The electric machine 106, wheel shafts 152 and 158, gear reductions 142 and 144 (e.g., final gear reductions), and differential 130 are again illustrated. The rotational axis 162 of the electric machine 106 is indicated along with rotational axes 700 of the wheel shafts 152 and 158. As such, the electric machine's axis is offset from the rotational axes of the wheels. This off-center packaging of the electric machine and wheels allows axle interference with the vehicle frame during suspension movement (e.g., jounce and rebound) to be avoided.

FIG. 8 shows the support structure 166 with vertically extending protrusions 204 and the recess 208 formed therebetween. The electric axle has been omitted from the illustration in FIG. 8 to reveal the support structure's profile. However, it will be understood that the electric axle 104, described above with regard to FIGS. 1-7 may be at least partially packaged in the support structure 166, as previously indicated. Slots 800 may extend vertically down the lateral sides 802 of the support structure 166. The slots may enable one or more shafts rotationally coupled to an internal combustion to extend therethrough when the support structure is used to cradle an engine. However, the support structure may not include the slots, in alternate examples. Further, it will be understood that the support structure 166 be an unsprung mass with regard to the suspension system.

The electric axles and associated vehicle components, and more specifically powertrain systems, components, and the like may provide for an operating method of an electric axle, such as any of the previously described electric axles. The electric axle operating method includes adjusting an electric motor based on an acceleration request.

The technical effect of the electric drive axle and operating method described herein is to achieve a space efficient axle package with desired performance characteristics which can be incorporated into a support structure and avoid interference with a vehicle frame.

FIGS. 1-8 show example configurations with relative positioning of the various components. The non-schematically depicted components in FIGS. 1-8 are drawn approximately to scale. However, it will be appreciated that if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred to as such, in one example. In other examples, elements offset from one another may be referred to as such. Still further in some examples, elements positioned coaxial or parallel to one another may be referred to as such.

The invention will be further described in the following paragraphs. In one aspect, an electric axle is provided that comprises an electric machine rotationally coupled to a layshaft via a first gear reduction; and a differential rotationally coupled to the first gear reduction, a first axle shaft, and a second axle shaft; wherein the electric machine is positioned laterally between at least two drive wheels that are rotationally coupled to the first axle shaft and the second axle shaft; and wherein a rotational axis of the electric machine is axially offset from rotational axes of the at least two drive wheels.

In another aspect, an electric drive assembly is provided that comprises an electric beam axle comprising: an electric machine rotationally coupled to a differential via a gear reduction; a differential rotationally coupled to the gear reduction, a first axle shaft, and a second axle shaft; wherein the second axle shaft extends laterally from a first axial side of the electric machine to a second axial side of the electric machine; wherein the electric machine is positioned laterally between at least two drive wheels that are rotationally coupled to the first axle shaft and the second axle shaft; and wherein a rotational axis of the electric machine is axially offset from rotational axes of the at least two drive wheels.

In yet another aspect, a single speed electric beam axle is provided that comprises an electric beam axle comprising: an electric machine rotationally coupled to a differential via a gear reduction; a differential rotationally coupled to the gear reduction, a first axle shaft, and a second axle shaft; a first final drive gear reduction rotationally coupled to the first axle shaft; and a second final drive gear reduction coupled to the second axle shaft; wherein the electric machine is positioned laterally between at least two drive wheels that are each rotationally coupled to one of the first and second final drive gear reductions; and wherein a rotational axis the electric machine is axially offset from rotational axes of the at least two drive wheels.

In another aspect, an electric axle assembly is provided that comprises an electric machine rotationally coupled to a layshaft via a first gear reduction; and a differential rotationally coupled to the layshaft via a second gear reduction; a first axle shaft and a second axle shaft directly rotationally coupled to the differential; wherein the electric machine is positioned laterally between at least two drive wheels that are rotationally coupled to the first axle shaft and the second axle shaft; wherein a rotational axis of the electric machine is axially offset from rotational axes of the at least two drive wheels; and wherein rotational axes of the drive wheels are offset from rotational axes of the first and second axle shafts.

In another aspect, an electric drive assembly is provided that comprises an electric beam axle comprising: a traction motor rotationally coupled to a differential via a first gear reduction and a second gear reduction which each include a gear coupled to a layshaft; wherein the differential is directly rotationally coupled to a first axle shaft and a second axle shaft; wherein the traction motor is positioned laterally between two drive wheels that are rotationally coupled to the first axle shaft and the second axle shaft; wherein a rotational axis of the traction motor is axially offset from rotational axes of the two drive wheels; and wherein rotational axes of the drive wheels are offset from rotational axes of the first and second axle shafts.

In yet another aspect, a single speed electric beam axle is provided that comprises a traction motor rotationally coupled to a differential via a first gear reduction and a second gear reduction which each include a gear rotationally coupled to a layshaft; wherein the differential is directly rotationally coupled to a first axle shaft and a second axle shaft; a first wheel end gear reduction directly rotationally coupled to the first axle shaft; and a second wheel end gear reduction directly rotationally coupled to the second axle shaft; wherein the traction motor is positioned laterally between two drive wheels that are each rotationally coupled to one of the first and second wheel end gear reductions; wherein a rotational axis the traction motor is axially offset from rotational axes of the two drive wheels; and wherein rotational axes of the drive wheels are offset from rotational axes of the first and second axle shafts.

In any of the aspects or combinations of the aspects, the electric drive assembly may further comprise a first wheel end gear reduction rotationally coupled to the first axle shaft and a second wheel end gear reduction coupled to the second axle shaft.

In any of the aspects or combinations of the aspects, the electric drive assembly may further comprise a support structure at least partially enclosing the traction motor and the differential; wherein the support structure includes vertically extending protrusions that are profiled to mate with an engine cradle; and wherein the second axle shaft extends underneath an oil reservoir.

In any of the aspects or combinations of the aspects, the differential may be an electronic locking differential designed to selectively inhibit a speed variance between the first and second axle shafts.

In any of the aspects or combinations of the aspects, the electric drive assembly may be a single speed front electric axle.

In any of the aspects or combinations of the aspects, the electric beam axle may further comprise a support structure at least partially enclosing the traction motor and the differential, wherein the support structure includes vertically extending protrusions that are profiled to mated with an engine cradle.

In any of the aspects or combinations of the aspects, the single speed electric beam axle may be a front axle that is included in a hybrid electric vehicle.

In any of the aspects or combinations of the aspects, the single speed electric beam axle may be a front axle that is included in an all-electric vehicle.

In any of the aspects or combinations of the aspects, the first axle shaft and the second axle shaft may have unequal axial lengths.

In any of the aspects or combinations of the aspects, the electric axle assembly may be a beam axle assembly.

In any of the aspects or combinations of the aspects, the electric axle assembly may further comprise a first wheel end gear reduction directly coupled to the first axle shaft and a first wheel shaft; and a second wheel end gear reduction directly coupled to the second axle shaft and a second wheel shaft.

In any of the aspects or combinations of the aspects, the first and second wheel end gear reductions may be final drive gear reductions.

In any of the aspects or combinations of the aspects, the differential may be a locking differential designed to selectively inhibit a speed variance between the first and second axle shafts.

In any of the aspects or combinations of the aspects, the second axle shaft may pass under an oil reservoir.

In any of the aspects or combinations of the aspects, the electric axle assembly may further comprise a support structure at least partially enclosing the electric machine and the differential, wherein the support structure includes vertically extending protrusions that are profiled to mate with an engine cradle.

In any of the aspects or combinations of the aspects, the electric axle may be a single speed electric axle.

In any of the aspects or combinations of the aspects, the electric axle assembly may be a front axle assembly.

In any of the aspects or combinations of the aspects, the electric axle may be a beam axle.

In any of the aspects or combinations of the aspects, the electric axle may further comprise a second gear reduction rotationally coupled to the first axle shaft and a third gear reduction coupled to the second axle shaft.

In any of the aspects or combinations of the aspects, the second and third gear reductions may be final drive gear reductions.

In any of the aspects or combinations of the aspects, the differential may be a locking differential designed to selectively inhibit speed variance between the first and second axle shafts.

In any of the aspects or combinations of the aspects, the second axle shaft may pass under an oil reservoir for an internal combustion engine.

In any of the aspects or combinations of the aspects, the electric axle may further comprise a support structure at least partially enclosing the electric machine and the differential.

In any of the aspects or combinations of the aspects, the support structure may include vertically extending protrusions that are profiled to mate with an engine cradle.

In any of the aspects or combinations of the aspects, the electric axle may be a front axle.

In any of the aspects or combinations of the aspects, the electric drive assembly may further comprise further comprising: a support structure at least partially enclosing the electric machine and the differential; wherein the support structure includes vertically extending protrusions that are profiled to mate with an engine cradle; and wherein the second axle shaft extends underneath an oil reservoir.

In any of the aspects or combinations of the aspects, the differential may be an electronic locking differential designed to selectively inhibit speed variance between the first and second axle shafts.

In any of the aspects or combinations of the aspects, the electric axle may be a front axle included in an all-electric vehicle.

In any of the aspects or combinations of the aspects, the electric axle may further comprise a support structure at least partially enclosing the electric machine and the differential, wherein the support structure includes vertically extending protrusions that are profiled to mated with an engine cradle.

In any of the aspects or combinations of the aspects, the second axle shaft may pass under an oil reservoir.

In any of the aspects or combinations of the aspects, the single speed electric beam axle may be a front axle included in a hybrid electric vehicle or an all-electric vehicle.

In another representation, an electrified axle for a P4 hybrid vehicle is provided that comprises an electric motor-generator positioned off center from rotational axes of drive wheels and between the drive wheels and a differential mechanically coupled to the electric motor-generator via a gear train with a pseudo-layshaft arrangement, wherein the differential is coupled to a first axle shaft having a different length than a second axle shaft that passes along a side of the electric motor-generator.

In yet another representation, an electric axle for a vehicle is provided that comprises an electric machine that is positioned laterally between two drive wheels, wherein a rotational axis of the electric machine is parallel to but not coaxial to rotational axes of the drive wheels, and wherein a gear train is rotationally coupled to the electric machine that includes an input shaft, and a layshaft with a gear that meshes with a gear in a differential.

In yet another representation, an electric axle for a vehicle is provided that comprises an electric machine that is positioned laterally between two drive wheel gear reductions, wherein the electric machine is positioned in a central section of a support structure below a recess that is formed between two vertically extending protrusions and wherein the two drive wheel gear reductions are positioned in two lateral sections of the support structure that include the two vertically extending protrusions.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle system, comprising:
a traction motor rotationally coupled to a shaft via a first gear reduction;
a differential rotationally coupled to the shaft via a second gear reduction;
a first axle shaft and a second axle shaft directly rotationally coupled to the differential;
a first final drive gear reduction directly rotationally coupled to the first axle shaft and a first wheel shaft; and
a second final drive gear reduction directly rotationally coupled to the second axle shaft and a second wheel shaft; and
a support structure at least partially enclosing the traction motor and the differential;
wherein the first final drive gear reduction and the second final drive gear reduction are at least partially enclosed by the support structure;
wherein the traction motor is positioned laterally between at least two drive wheels that are rotationally coupled to the first wheel shaft and the second wheel shaft;
wherein a rotational axis of the traction motor is axially offset from rotational axes of the at least two drive wheels; and
wherein the first axle shaft and the second axle shaft have unequal lengths.

2. The electric axle system of claim 1, wherein the traction motor is configured to electrically connect to an inverter.

3. The electric axle system of claim 1, wherein the differential is an open differential.

4. The electric axle system of claim 1, further comprising a support structure that at least partially encloses the traction motor and includes multiple vertically extending protrusions.

5. The electric axle system of claim 1, wherein:
the electric axle system is a single speed electric axle; and
the electric axle system is a front axle system.

6. The electric axle system of claim 1, wherein rotational axes of the at least two drive wheels are offset from rotational axes of the first and second axle shafts.

7. A single speed electric beam axle system, comprising:
a traction motor rotationally coupled to a shaft via a first gear reduction;
a differential rotationally coupled to the shaft via a second gear reduction;
a first axle shaft and a second axle shaft directly rotationally coupled to the differential;
a first final drive gear reduction directly rotationally coupled to the first axle shaft and a first wheel shaft;
a second final drive gear reduction directly coupled to the second axle shaft and a second wheel shaft; and
a support structure that at least partially encloses the traction motor;
wherein the first final drive gear reduction and the second final drive gear reduction are at least partially enclosed by the support structure;
wherein the traction motor is positioned laterally between at least two drive wheels that are rotationally coupled to the first wheel shaft and the second wheel shaft;
wherein a rotational axis of the traction motor is axially offset from rotational axes of the at least two drive wheels; and
wherein the first axle shaft and the second axle shaft have unequal lengths.

8. The single speed electric beam axle system of claim 7, wherein the single speed electric beam axle system is a front axle system.

9. The single speed electric beam axle system of claim 7, wherein the traction motor is a multi-phase alternating current (AC) motor-generator.

10. The single speed electric beam axle system of claim 7, wherein the differential is an open differential or a locking differential.

11. The single speed electric beam axle system of claim 7, wherein the support structure at least partially encloses the differential.

12. The single speed electric beam axle system of claim 7, wherein the support structure includes multiple vertically extending protrusions.

13. The single speed electric beam axle system of claim 7, wherein the first and second final drive gear reductions are formed from multiple helical gears.

* * * * *